United States Patent
Kato (10) Patent No.: US 9,688,103 B2
(45) Date of Patent: Jun. 27, 2017

(54) MOTORCYCLE TIRE

(71) Applicant: SUMITOMO RUBBER INDUSTRIES, LTD., Kobe-shi, Hyogo (JP)

(72) Inventor: Tomoki Kato, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 911 days.

(21) Appl. No.: 14/045,970

(22) Filed: Oct. 4, 2013

(65) Prior Publication Data
US 2014/0102608 A1    Apr. 17, 2014

(30) Foreign Application Priority Data
Oct. 16, 2012    (JP) .................................. 2012-229184

(51) Int. Cl.
*B60C 11/03*    (2006.01)

(52) U.S. Cl.
CPC ........ *B60C 11/0302* (2013.01); *B60C 11/033* (2013.04); *B60C 11/0304* (2013.04); *B60C 2011/0374* (2013.04); *B60C 2011/0379* (2013.04); *B60C 2200/10* (2013.04)

(58) Field of Classification Search
CPC ............... B60C 11/0302; B60C 11/033; B60C 2200/10; B60C 2011/0362; B60C 2011/0379
See application file for complete search history.

(56) References Cited

FOREIGN PATENT DOCUMENTS

| JP | 63121505 A | * | 5/1988 |
| JP | 63-159109 A |   | 7/1988 |
| JP | 7108604 B | * | 11/1995 |
| JP | 2011116258 A | * | 6/2011 |
| JP | 2012176680 A | * | 9/2012 |

OTHER PUBLICATIONS

Machine Translation: JP 2011116258 A; Hayashi, Takaki; no date.*
Machine Translation: JP 7108604 B; no date.*
Machine Translation: JP 2012176680 A; Matsunami, Toshiyuki; no date.*

* cited by examiner

*Primary Examiner* — Steven D Maki
*Assistant Examiner* — Kendra Ly
(74) *Attorney, Agent, or Firm* — Birch, Stewart, Kolasch & Birch, LLP (57) ABSTRACT

A motorcycle tire has a unidirectional tread pattern formed by a circumferentially extending center main groove, and main oblique grooves each with a branch groove. The main oblique groove has an axially inner end inside a zero-camber ground contacting width and an axially outer end outside the zero-camber ground contacting width. The axially outer end is positioned in a range between 0% and 20% of the developed half tread width from the tread edge. The branch groove is composed of a first inclined part extending from the main oblique groove at an angle θ with respect to the tire circumferential direction, and a second inclined part extending at an angle δ less than the angle θ. When the developed half tread width is axially equally divided into five portions, the land ratio of each of the five portions is 75% to 85%.

7 Claims, 5 Drawing Sheets

MOTORCYCLE TIRE

BACKGROUND OF THE INVENTION

The present invention relates to a pneumatic tire, more particularly to a unidirectional tread pattern of a motorcycle tire.

In order to improve wet performance of a motorcycle tire such as grip performance, Japanese Patent Publication (KOKAI) No. 63-159109 proposes tread patterns comprising a straight or zigzag central groove extending continuously in the tire circumferential direction and dogleg grooves disposed on each side of the central groove in an overlapping manner.

In such tread patterns, however, there is a possibility that dry performance is deteriorated due to the decreased land ratio or relative ground contacting area. Further, as the circumferential rigidity of the tread portion is decreased by the overlap arrangement of the dogleg grooves, there is a possibility that the durability and wear resistance of the tread portion are decreased.

SUMMARY OF THE INVENTION

It is therefore, an object of the present invention to provide a motorcycle tire in which wet performance, dry performance and the durability of the tread portion are improved.

According to the present invention, a motorcycle tire comprises
a tread portion provided with tread grooves defining a unidirectional tread pattern having an intended tire rotational direction,
the tread grooves including a center main groove and a plurality of main oblique grooves each with a branch groove, wherein
the center main groove extends along the tire equator continuously in the tire circumferential direction,
the main oblique grooves are disposed on both sides of the center main groove so that each of the main oblique grooves has an axially inner end at a distance from the center main groove and extends axially outwardly from the axially inner end, while inclining to the opposite direction to the intended tire rotational direction, at an angle of from 30 to 45 degrees with respect to the tire circumferential direction,
the axially inner ends of the main oblique grooves are positioned within a zero-chamber ground contact width, and
axially outer ends of the main oblique grooves are positioned outside the zero-chamber ground contact width and each at a distance of from 0% to 20% of a developed half tread width from the tread edge,
the branch groove is branched off from the main oblique groove and extends toward the opposite direction to the intended tire rotational direction, while inclining to the axially inside, and terminates at a distance from the center main groove without being connected thereto,
the branch groove is a bent groove comprising
a first inclined part extending from the main oblique groove at an angle θ with respect to the tire circumferential direction, and
a second inclined part extending at an angle δ with respect to the tire circumferential direction which is less than the angle θ,
on each side of the tire equator, when the developed half tread width is axially equally divided into five portions, the land ratio of each of the five portions is in a range of 75% to 85%.

The motorcycle tire according to the present invention can be provided with the following features (1)-(5);
(1) the tread grooves further include sub oblique grooves having a length less than the length of the main oblique grooves, and
on each side of the center main groove, the sub oblique grooves are disposed alternately with the main oblique grooves so that the sub oblique grooves are inclined in the same direction as the main oblique grooves;
(2) a branch point of the branch groove from the main oblique groove, which is defined by an intersecting point between widthwise center lines of the main oblique groove and the branch groove, is in a range between 40% and 60% of the developed half tread width from the tire equator, and
the branch groove extends within a range between 20% and 60% of the developed half tread width from the tire equator;
(3) the depth of the branch groove is in a range of from 50% to 70% of the depth of the main oblique groove at the branch point;
(4) a bent point of the branch groove, which is defined by an intersecting point between the widthwise center line of the first inclined part and the widthwise center line of the second inclined part, is in a range between 20% and 40% of the developed half tread width from the tire equator;
(5) a land ratio Rc of an annular tread portion between 0% and 20% of the developed half tread width from the tire equator, a land ratio Rm of an annular tread portion between 40% and 60% of the developed half tread width from the tire equator, and a land ratio Rs of an annular tread portion between 80% and 100% of the developed half tread width from the tire equator satisfy the following condition $$Rm<Rc<Rs.$$

Therefore, it is possible that, according to the rolling of the tire, the main oblique grooves lead water toward the outside of the ground contacting patch which occurs at any camber angles. Thus, wet performance is improved.

The branch groove, together with the main oblique groove, leads water toward both sides of the ground contacting patch occurring during cornering. Owing to the second inclined part of the branch groove, the rigidity of the tread center area is maintained, and the cornering power at zero camber angle is increased. Thus, dry performance is improved. Further, the durability of the tread portion is improved.

Since all the land ratios are limited in a narrow range of from 75% to 85%, in a wide range from a zero camber angle state to a maximum camber angle state of the tire, the land ratio of the ground contacting patch is also limited in a narrow range, therefore, dry performance and wet performance are maintained at high levels. Further, damage of the tread portion such as uneven wear is prevented, and the durability of the tread portion can be improved.

In this application including specification and claims, various dimensions, positions and the like of the tire refer to those under a normally inflated unloaded state of the tire unless otherwise noted.

The normally inflated unloaded state is such that the tire is mounted on a standard wheel rim and inflate to a standard pressure but loaded with no tire load.

The undermentioned normally inflated loaded state is such that the tire is mounted on the standard wheel rim and inflated to the standard pressure and loaded with the standard tire load.

The standard wheel rim is a wheel rim officially approved or recommended for the tire by standards organizations, i.e.

JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The following specific terms used in this application including specification and claims are defined as follows:

"Developed half tread width" is the curved axial distance from the tire equator to one of the tread edges along the tread surface.

"zero-chamber ground contact width" is defined between two circumferential lines L1 passing through the axial outermost edges of the ground contacting patch of the tire at camber angle=0 in the normally inflated loaded state.

"Land ratio" is the ratio of the ground contacting area to the overall area of the part concerned.

DESCRIPTION OF THE PREFERRED EMBODIMENTS

Embodiments of the present invention will now be described in detail in conjunction with accompanying drawings.

In the drawings, motorcycle tire 1 according to the present invention comprises a tread portion 2, a pair of axially spaced bead portions 4 each with a bead core 5 therein, a pair of sidewall portions 3 extending between the tread edges and the bead portions 4, a carcass 6 extending between the bead portions 4, and a belt layer 7 disposed radially outside the carcass 6 in the tread portion 2.

Figure 1:
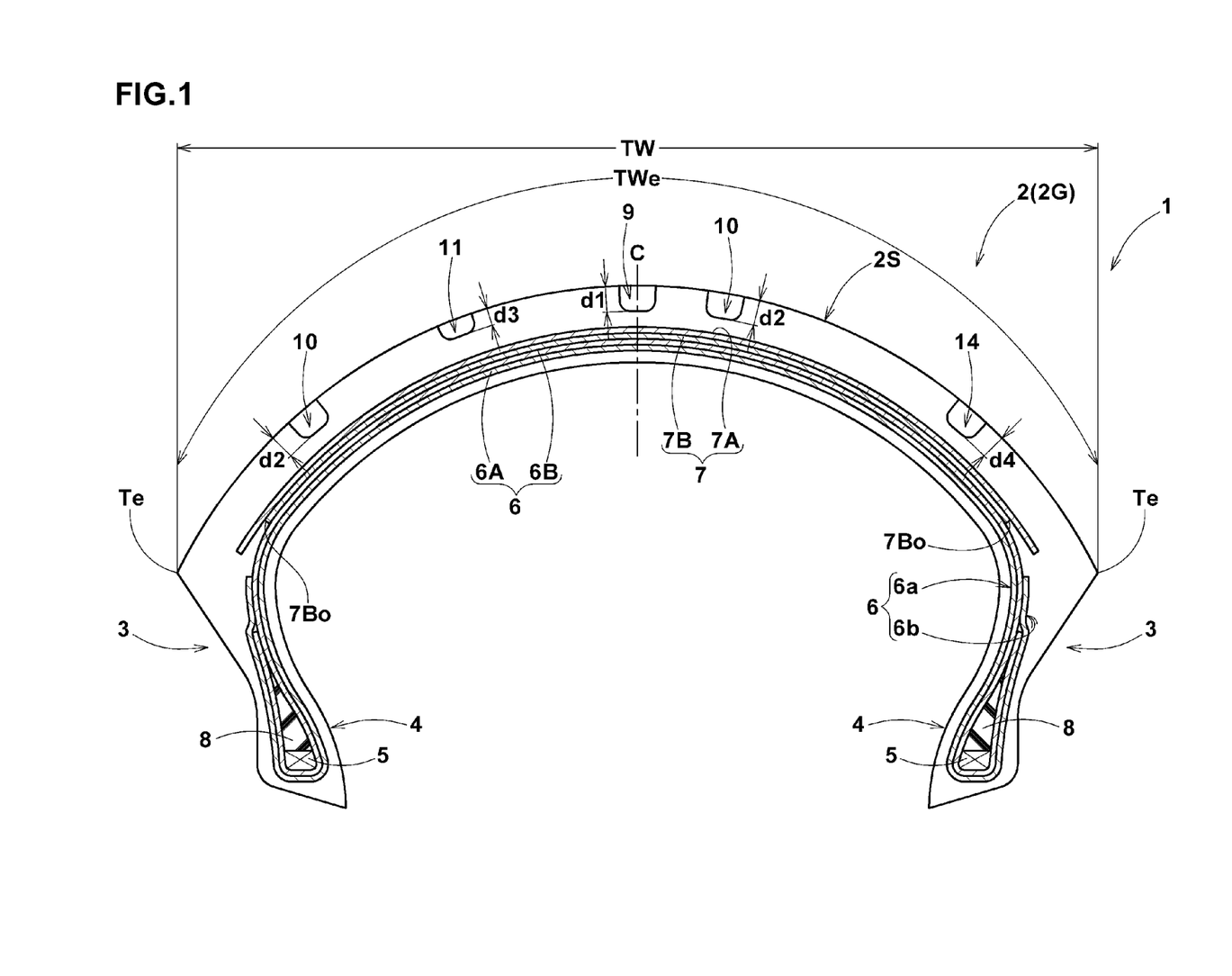
FIG. 1 is a cross sectional view of a motorcycle tire as an embodiment of the present invention under the normally inflated unloaded state of the tire.

In order to facilitate the leaning necessary when a motorcycle turns, the tread portion 2 (inclusive of the carcass 6, belt layer 7 and a tread rubber thereon) is curved with a relatively small radius of curvature when compared with the passenger car tires, truck/bus tires and the like, and as a result, the maximum cross section width Tw of the tire lies between the tread edges Te.

The carcass 6 is composed of two cross plies 6A and 6B of cords. The cords of each ply are arranged radially at an angle of from 30 to 45 degrees with respect to the tire equator C. Each ply 6A, 6B extends between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. For the carcass cords, organic fiber cords, e.g. nylon, polyester, rayon and the like can be used suitable.

The bead portions 4 are each provided between the main portion 6a and turned up portion 6b of the carcass ply with a bead apex 8 made of a hard rubber extending radially outwardly from the bead core 5 in a tapered manner in order to reinforce the bead portion 4.

The belt layer 7 comprises two cross plies 7A and 7B of substantially parallel cords laid at an angle in a range of from 15 to 25 degrees with respect to the tire equator C. The two cross plies 7A and 7B have different widths. In this example, the wider ply 7A is disposed radially outside the narrower ply 7B. For the belt cords, steel cords, aramid cords, rayon cords and the like can be used suitably.

Figure 2:
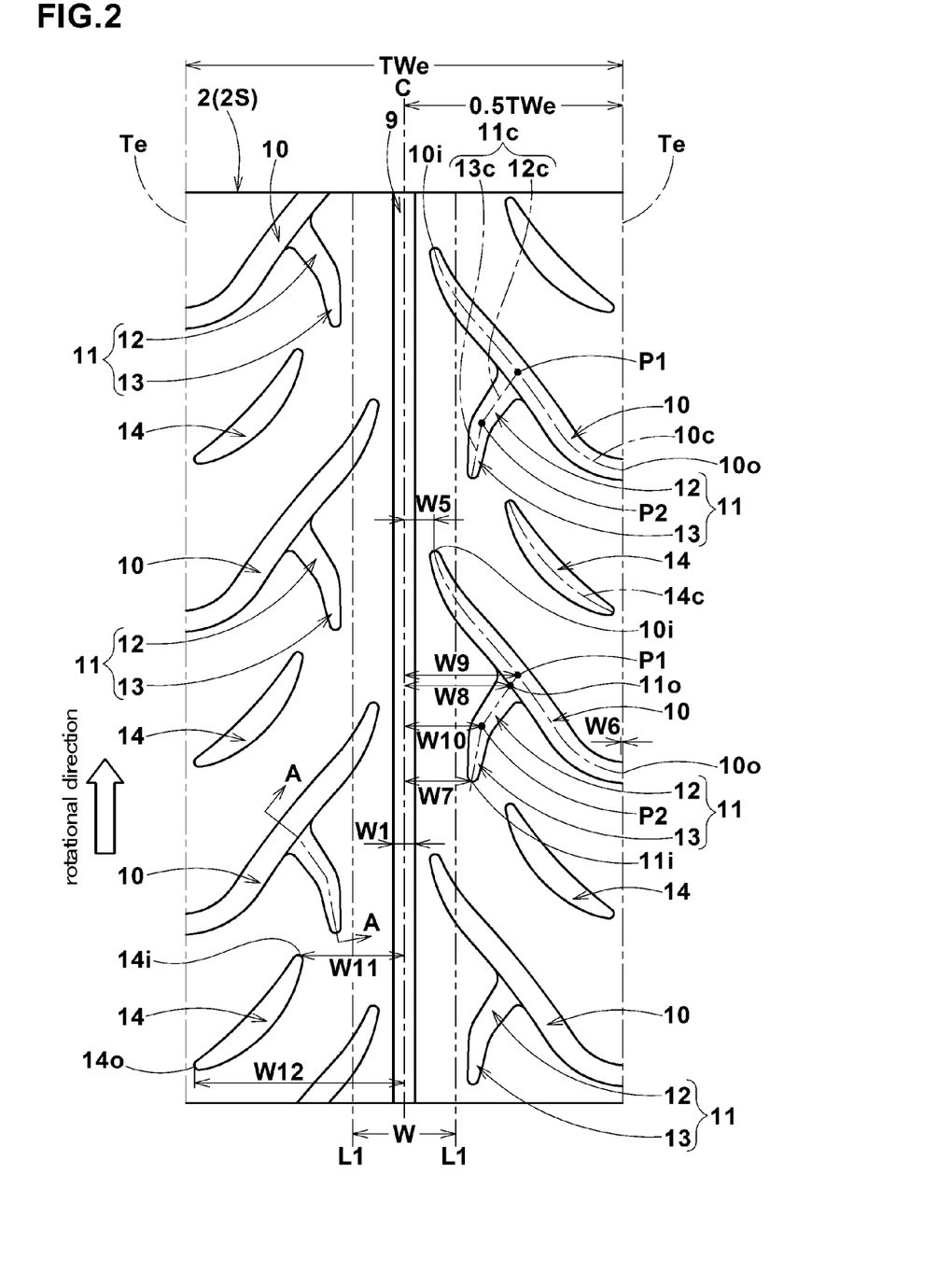
FIG. 2 and FIG. 3 are a developed view of the tread portion thereof.

The tread portion 2 is provided with tread grooves defining a directional tread pattern having an intended tire rotational direction as shown in FIG. 2. Incidentally, the intended rotational direction is indicated in the sidewall portion 3.

The tread grooves include a center main groove 9, main oblique grooves 10 each with a branch groove 11 and sub oblique grooves 14.

The center main groove 9 extends on the tire equator C continuously and circumferentially of the tire.
The center main groove 9 in this example is a straight groove not connected by any grooves. Aside from such configuration, a zigzag configuration, S-shaped configuration or the like may be employed.

In order to ensure necessary drainage and the rigidity of a central zone of the tread portion 2 which is necessary for a good stability during straight running and a good initial response, the width W1 of the center main groove 9 is preferably set in a range of not less than 2.5%, more preferably not less than 3.0%, but not more than 4.5%, more preferably not more than 4.0% of the tread developed width Twe, and the depth d1 of the center main groove 9 is set in a range of from 3 to 6 mm.

The main oblique grooves 10 are disposed on both sides of the tire equator C. The main oblique grooves 10 on each side of the tire equator C are arranged circumferentially of the tire at intervals and in this example circumferentially shifted from the main oblique grooves 10 on the other side of the tire equator in order to improve the drainage performance at high speed running.

In order not to decrease the rigidity of the tread portion in the vicinity of the center main groove 9, each of the main oblique grooves 10 has an axially inner end 10i at a distance from the center main groove 9.

In order to effectively discharge water existing in the ground contacting patch of the tire during straight running, the axial distance w5 of the inner end 10i measured from the tire equator C along the tread surface is preferably 20% or less, more preferably 15% or less of the developed half tread width 0.5 TWe.
Thereby, the inner end 10i is positioned within the ground contacting patch during straight running.
The axially outer end 10o of the main oblique groove 10 is positioned outside the ground contacting patch during straight running.

In order to secure the above-mentioned rigidity, the distance w5 is set to be not less than 5%, preferably not less than 10% of the developed half tread width 0.5 TWe.

In order that the main oblique groove 10 exerts its drainage function widely from a zero camber angle state during straight running to a maximum camber angle state during cornering, the axial distance w6 of the outer end 10*o* measured along the tread surface from the tread edge Te is 20% or less of the developed half tread width 0.5 TWe. In this example, the outer end 10*o* is positioned at the tread edge Te. (W6=0)

The main oblique groove 10 is inclined to the opposite direction to the intended tire rotational direction, while extending from its axially inner end 10*i* to outer end 10*o*, in order that water is introduced toward the axially outside. Preferably, the inclination angle γ of the main oblique groove 10 is not less than 30 degrees, but not more than 45 degrees with respect to the tire circumferential direction.

When the angle γ of the main oblique groove 10 is varied along the length, the above-mentioned value of the angle γ is the length weighted average value.

If the angle γ is more than 45 degrees, the drainage efficiency tends to decrease. If the angle γ is less than 30 degrees, there is a possibility that the axial rigidity of the tread portion in a corresponding area to a ground contacting patch during cornering becomes insufficient.

In order to ensure the drainage and the rigidity of the tread portion 2 in its lateral zone which is necessary for a good stability during cornering, the width W2 of the main oblique groove 10 is preferably set in a range of not less than 3 mm, more preferably not less than 4 mm, but not more than 7 mm, more preferably not more than 6 mm, and the depth d2 of the main oblique groove 10 is preferably set in a range of not less than 4 mm, more preferably not less than 5 mm, but not more than 8 mm, more preferably not more than 7 mm.

Figure 4:
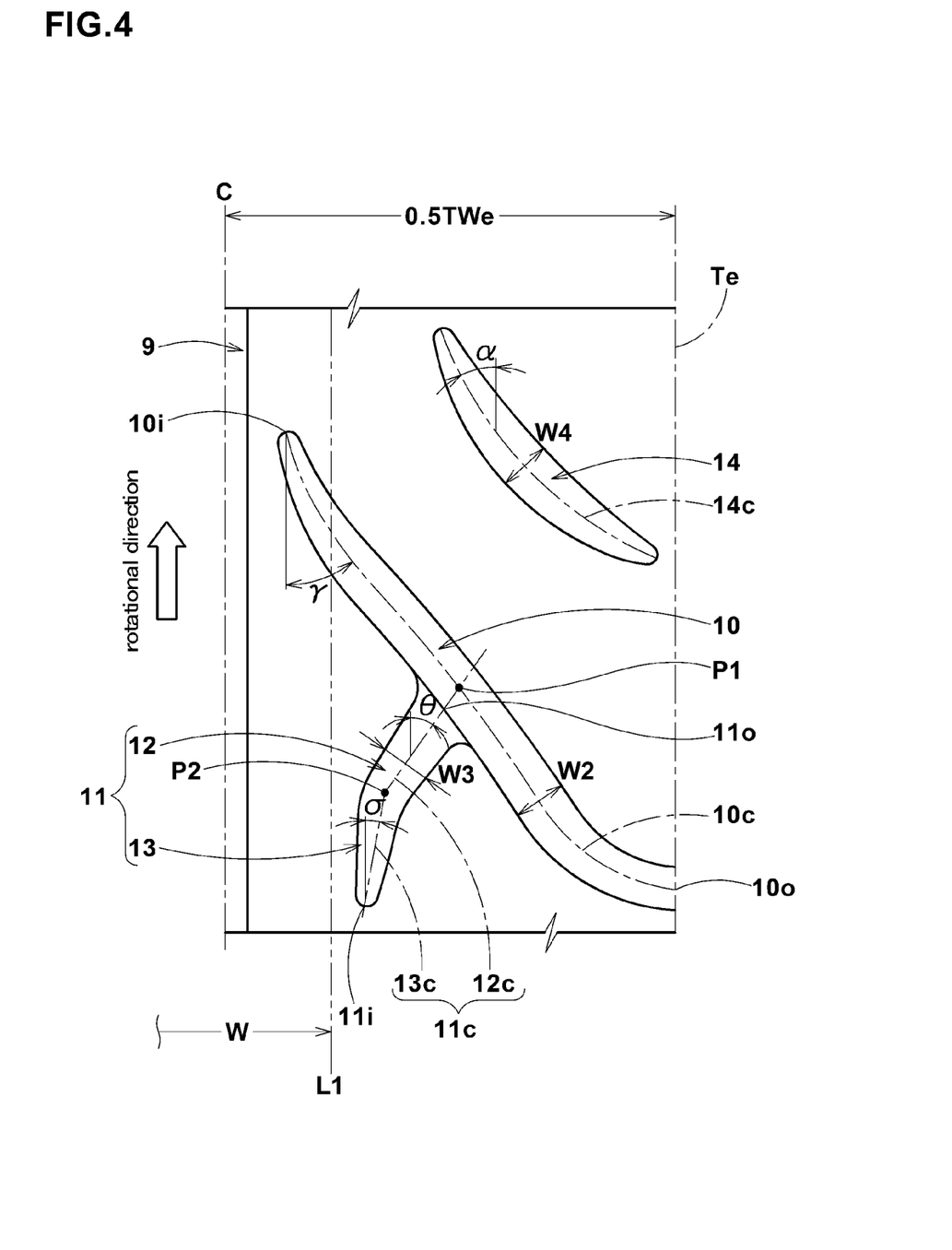
FIG. 4 is an enlarged view showing a main oblique groove with a branch groove and a sub oblique groove.

The branch groove 11 is branched off from the main oblique groove 10, and extend toward the opposite direction to the intended tire rotational direction, while inclining to the axially inside of the tire.

The branch point or the axially outer end 11*o* of the branch groove 11 is positioned in the middle of the length of the main oblique groove 10. Further, the axially inner end 11*i* of the branch groove 11 is positioned at a distance from the center main groove 9.

If the branch groove 11 is close to the tire equator C, the rigidity of the tread portion 2 is decreased in the vicinity of the tire equator C. If the branch groove 11 is far from the tire equator C, the branch groove 11 can not increase the drainage. Therefore, the axial distance w7 of the axially inner end 11*i* measured from the tire equator C along the tread surface is preferably not less than 20%, more preferably not less than 30% of the developed half tread width 0.5 TWe, and the axial distance W8 of the axially outer end 11*o* measured from the tire equator C along the tread surface is preferably not more than 60%, more preferably not more than 50% of the developed half tread width 0.5 TWe.

By limiting the inner end 11*i* and outer end 11*o* within such ranges, wet performance during high speed cornering can be improved.

It is preferable that the width W3 of the branch groove 11 is gradually decreased from its outer end 11*o* toward its inner end 11*i* in order to control the decrease in the axial rigidity of the tread portion 2 and thereby secure the stability during cornering. If the groove width w3 becomes too small, the drainage by the branch groove 11 becomes insufficient. If too large, there is a possibility that the axial rigidity decreases and the stability deteriorates. Therefore, it is preferable that the maximum of the groove width W3 is not less than 3 mm, more preferably not less than 4 mm, but not more than 7 mm, more preferably not more than 6 mm.

The branch groove 11 comprises a first inclined part 12 and a second inclined part 13.

The first inclined part 12 extends from the main oblique groove 10 toward the opposite direction to the intended tire rotational direction, while inclining to the axially inside. Preferably, the angle θ of the widthwise center line 13*c* of the first inclined part is set in a range of not less than 30 degrees, more preferably not less than 35 degrees, but not more than 45 degrees, more preferably not more than 40 degrees with respect to the tire circumferential direction.

If the angle θ is more than 45 degrees, the drainage performance tends to deteriorate. If the angle θ is less than 30 degrees, the lateral stiffness (rigidity) of the tread portion 2 is decreased.

The second inclined part 13 extends from the first inclined part 12 at an inclination angle less than that of the first inclined part 12 with respect to the tire circumferential direction.

The angle δ of the widthwise center line 13*c* of the second inclined part 13 with respect to the tire circumferential direction is less than the above-mentioned angle θ.

Preferably, the angle δ is set in a range of not less than 5 degrees, more preferably not less than 8 degrees, but not more than 20 degrees, more preferably not more than 15 degrees. Therefore, the second inclined part 13 can increase the length of the branch groove 11 to improve the drainage, without approaching the ground contacting patch during straight running. Thus, the decrease in the rigidity in the vicinity of tire equator C can be avoided.

If the angle δ is more than 20 degrees, there is a possibility that the circumferential rigidity of the tread portion 2 becomes insufficient. If the angle δ is less than 5 degrees, there is a possibility that the effect of enhancing the drainage of the branch groove 11 decreases.

If the branch point of the branch groove 11 approaches the tire equator C, there is a possibility that the stability is deteriorated. If the branch point approaches the tread edges Te, the effect of enhancing the drainage of the branch groove 11 decreases, and there is a possibility that uneven wear and rubber tearing-off occur in the vicinity of the tread edges Te during cornering at a large camber angle.

Therefore, the axial distance w9 of the branch point measured from the tire equator C along the tread surface is preferably set in a range of not less than 40%, more preferably not less than 45%, but not more than 60%, more preferably not more than 55% of the developed half tread width 0.5 TWe.

The branch point may be defined by an intersecting point P1 between the widthwise center line 10*c* of the main oblique groove 10 and the widthwise center line 11*c* of the branch groove 11. Even if the maximum tire load given by the load index is applied, the branch point P1 is not in the ground contacting patch, therefore, uneven wear and rubber tearing-off in the vicinity of the branch point P1 can be prevented, and cracks at the groove bottom due to stress concentration can be prevented.

It is preferable to limit the position of the bent point P2 of the branch groove 11 which point is the intersecting point between the widthwise center line 12*c* of the first inclined part 12 and the widthwise center line 13*c* of the second inclined part 13.

If the distance between the bent point P2 and the tire equator C is decreased, as the first inclined part 12 approaches the ground contacting patch during straight running, there is a possibility that the circumferential rigidity of the tread portion 2 is decreased. If the distance between the bent point P2 and the tire equator C is increased, as the angle of the first inclined part 12 with respect to the tire circumferential direction is decreased, there is a possibility that the axial rigidity of the tread portion 2 becomes insufficient in the ground contacting patch during cornering.

Therefore, the axial distance W10 of the bent point P2 measured from the tire equator C along the tread surface is preferably set in a range of not less than 15%, more preferably not less than 20%, but not more than 40%, more preferably not more than 35% of the developed half tread width 0.5 TWe.

Figure 5:
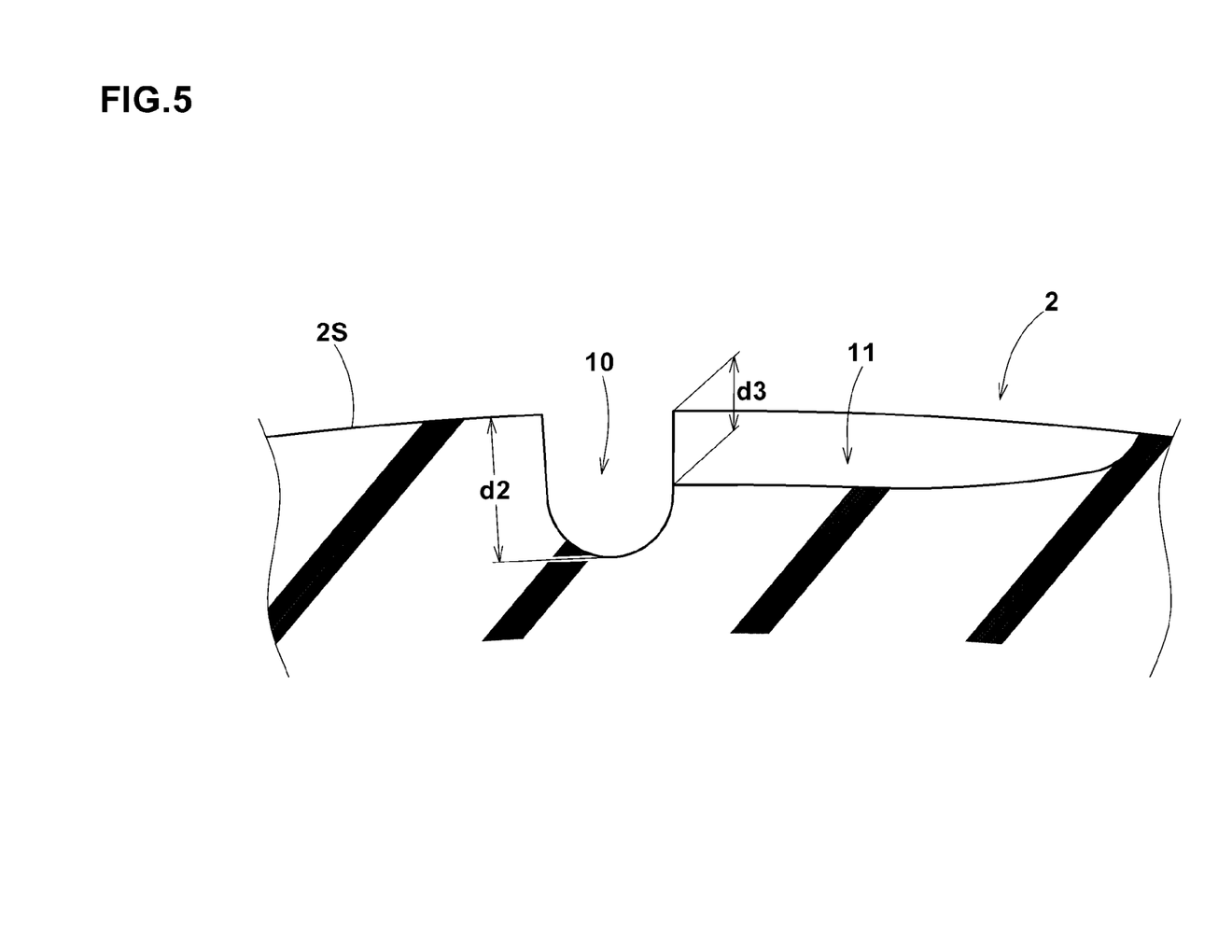
FIG. 5 is a cross sectional view taken along the widthwise center line of the branch groove shown in FIG. 2.

As shown in FIG. 5 which shows a cross section taken along the widthwise center line of the branch groove 11, it is preferable that, along the entire length of the branch groove 11, the groove depth d3 of the branch groove 11 is less than the groove depth d2 of the main oblique groove 10. If the depth d2 of the main oblique groove 10 is equal to the depth d3 of the branch groove 11, then the rigidity is decreased near the branch point P1 and uneven wear is liable to occur. Further, the axial rigidity of the tread portion 2 decreases, therefore it becomes difficult to smoothly end the leaning of the machine during cornering, and the stability during cornering is deteriorated.

In order to enhance the drainage of the branch groove 11, the depth d3 of the branch groove 11 is not less than 50%, preferably not less than 55% of the depth d2 of the main oblique groove 10 at the branch point P1. But, in order to avoid the occurrence of uneven tread wear, the depth d3 of the branch groove 11 is preferably not more than 70%, more preferably not more than 65% of the depth d2 of the main oblique groove 10 at the branch point P1.

The sub oblique grooves 14 are disposed on both sides of the center main groove 9. The length of the sub oblique groove 14 is smaller than the length of the main oblique groove 10.

On each side of the center main groove 9, the sub oblique grooves 14 are arranged alternately with the main oblique grooves 10, and all incline in the same direction as the main oblique grooves 10.

The axial distance W11 of the axially inner end 14$i$ of the sub oblique groove 14 measured from the tire equator C along the tread surface is preferably not less than 40%, more preferably not less than 50% of the developed half tread width 0.5 TWe. The axial distance W12 of the axially outer end 14$o$ of the sub oblique groove 14 measured from the tire equator C along the tread surface is preferably not more than 100%, more preferably not more than 95% of the developed half tread width 0.5 TWe. Thus, the sub oblique grooves 14 can provide drainage function during cornering at relatively large camber angles such that the ground contacting patch occurs on the axially outside of the branch points P1.

The angle α of the widthwise center line 14$c$ of the sub oblique groove 14 with respect to the tire circumferential direction is preferably not less than 35 degrees, more preferably not less than 40 degrees, but not more than 55 degrees, more preferably not more than 50 degrees.

If the angle α is more than 55 degrees, the drainage decreases. If the angle α is less than 35 degrees, the axial rigidity of the tread portion 2 decreases, the stability during cornering is deteriorated.

It is preferable that the width W4 of the sub oblique groove 14 is set in a range of not less than 3 mm, more preferably not less than 4 mm, but not more than 7 mm, more preferably not more than 6 mm, and the depth d4 of the sub oblique groove 14 is set in a range of not less than 3 mm, more preferably not less than 4 mm, but not more than 7 mm, more preferably not more than 6 mm in order not to decrease the rigidity of the tread portion 2 and not to decrease the drainage.

Figure 3:
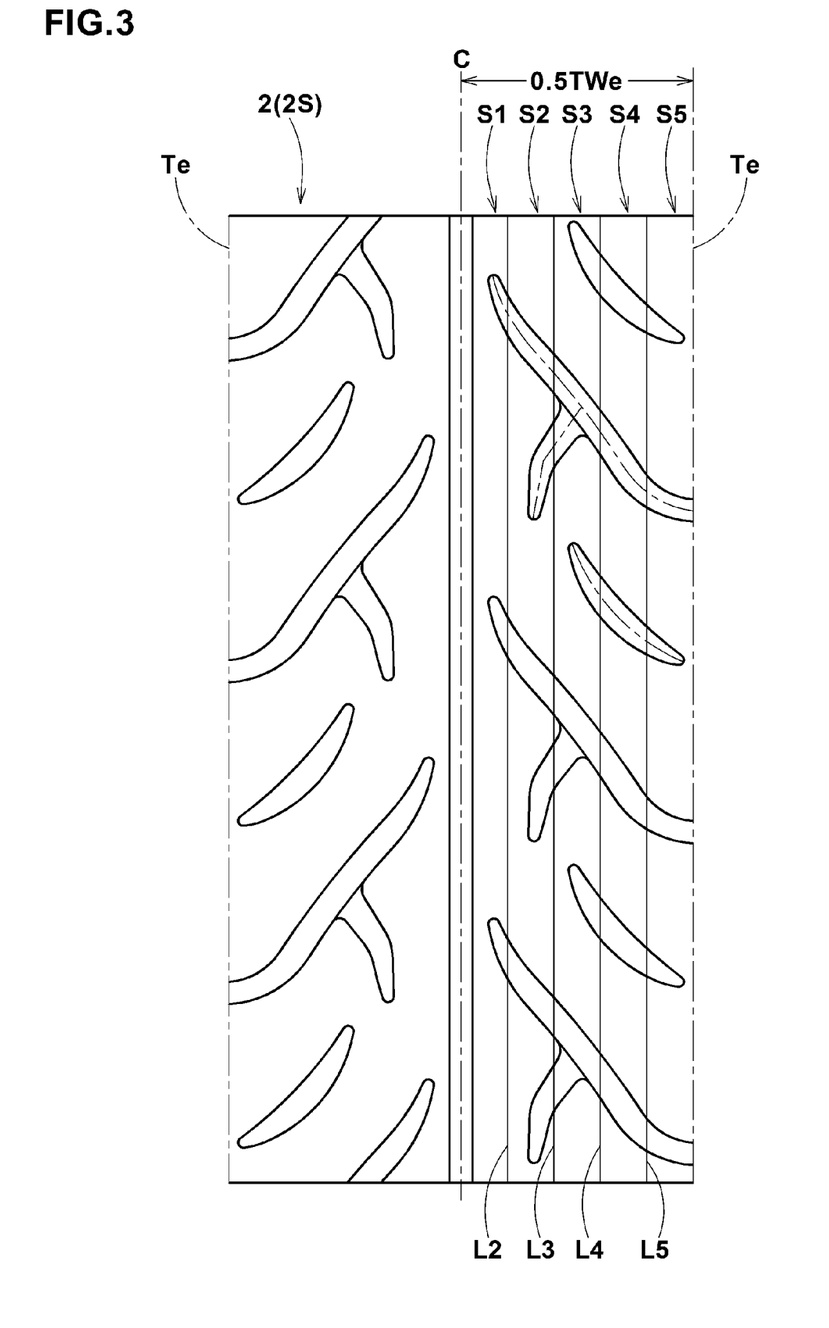

Given that the developed half tread width 0.5 TWe on each side of the tire equator C is equally axially divided into five portions S1-S5 with circumferential lines L2-L5 as shown in FIG. 3, the land ratio of each of the five portions S1-S5 is set in a relatively narrow range of from 75% to 85%.

Thus, the variation of the land ratio of the ground contacting patch when axially shift from a zero camber angle state to a maximum camber angle state, can be limited in a narrow range. Therefore, dry performance and wet performance can be maintained at high levels in all the states, and uneven tread wear can be prevented, and further the durability of the tread portion 2 can be improved.

In this case, however, it is preferable that the land ratio Rc of the region S1 (0%-20% of 0.5 TWe), the land ratio Rm of the region S3 (40%-60% of 0.5 TWe) and the land ratio Rs of the region S5 (80%-100% of 0.5 TWe) satisfy the following condition:

$$Rm<Rc<Rs.$$

The reason is as follows. Under such a condition that the ground contacting patch occurs in the two regions S1, in other words, during straight running with zero camber angle or very small camber angles, both of wet performance and dry performance are important.

Under such a condition that the ground contacting patch occurs mainly in the region S2 or S3, in other words, during cornering with about one half of the maximum camber angle, weight is attached to wet performance than dry performance. Therefore, it is preferable that the land ratio (Rm) is smaller than the land ratio (Rc) of the region S1.

Under such a condition that the ground contacting patch occurs mainly in the region S4 or S5, in other words, during cornering with camber angles more than one half of the maximum, weight is attached to dry performance than wet performance because the rider hardly leans the machine so largely under wet conditions. Therefore, it is preferable that the land ratio (Rs) is larger than those (Rm, Rc) of the regions S1-S3.

Comparison Tests

Motorcycle tires having the internal structure shown in FIG. 1 and tread patterns based on that shown in FIG. 2 were prepared and tested as follows. Specifications of the tread patterns are shown in Table 1.

Tire Size:

Front: 70/90-17 (rim size: WM1.40×17, tire pressure: 200 kPa)

Rear: 80/90-17 (rim size: WM1.60×17, tire pressure: 225 kPa)

<Drainage Test>

The test tires were installed on the front and rear wheels of a 110 cc motorcycle. The motorcycle was run along a 40 meter radius circle on an asphalt road partially provided with a mm depth 20 m long water pool, and the lateral acceleration (lateral G) during running in the water pool was measured at the front wheels, gradually increasing the speed entering into the water pool, to obtain the average for the speed range of from 50 to 80 km/h.

The test results are shown in Table 1 by an index based on comparative example tire Ref. 1 being 100, wherein the higher the index number, the better the drainage.

<Wet/Dry Grip, Roll Characteristic, Initial Response Test>

Using the above-mentioned motorcycle, the test rider evaluated the dry grip, roll characteristic and initial response when running on a dry asphalt road, and the wet grip when running on a wet asphalt road.

The test results are shown in Table 1 by an index based on comparative example tire Ref. 1 being 100, wherein the higher the index number, the better the performance.

<Uneven Wear Resistance Test>

The above-mentioned motorcycle was run zigzag (one zigzag cycle=2 seconds, zigzag width=3 m) at a speed of 80 km/h for 30 minutes. Then the tread wear was measured at the tread edges.

The test results are shown in Table 1 by an index based on comparative example tire Ref. 1 being 100, wherein the higher the index number, the better the uneven wear resistance.

<Durability Test>

The test tire mounted on a rim and inflated to 225 kPa, was run on a 1.7 m dia. tire test drum under a vertical tire load of 1.24 kN at a speed of 50 km/h, and the running distance until any damage occurs in the tread portion was measured.

The test results are shown in Table 1 by an index based on comparative example tire Ref. 1 being 100, wherein the higher the index number, the better the durability.

From the test results, it was confirmed that the embodiment tires were improved in the wet and dry performances and the durability of the tread portion.

TABLE 1

| Tire | Ref. 1 | Ref. 2 | Ref. 3 | Ref. 4 | Ref. 5 | Ref. 6 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|---|---|
| distance W5/0.5TWe (%) | 10.0 | 30.0 | 10.0 | 10.0 | 10.0 | 10.0 | 10.0 | 10.0 | 10.0 | 10.0 | 10.0 | 20.0 | 10.0 | 10.0 | 10.0 |
| distance W6/0.5TWe (%) | 0.0 | 0.0 | 30.0 | 0.0 | 30.0 | 0.0 | 0.0 | 0.0 | 0.0 | 0.0 | 0.0 | 0.0 | 20.0 | 0.0 | 0.0 |
| angle γ (deg.) | 38.0 | 38.0 | 38.0 | 25.0 | 50.0 | 38.0 | 38.0 | 38.0 | 38.0 | 38.0 | 38.0 | 38.0 | 38.0 | 38.0 | 38.0 |
| distance W7/0.5TWe (%) | — | 30.0 | — | 30.0 | 30.0 | 16.0 | 30.0 | 30.0 | 20.0 | 37.0 | 50.0 | 30.0 | 30.0 | 30.0 | 30.0 |
| distance W8/0.5TWe (%) | — | 48.0 | — | 48.0 | 48.0 | 48.0 | 48.0 | 48.0 | 38.0 | 55.0 | 75.0 | 48.0 | 35.0 | 48.0 | 48.0 |
| distance W9/0.5TWe (%) | — | 53.0 | — | 53.0 | 53.0 | 53.0 | 53.0 | 53.0 | 43.0 | 60.0 | 80.0 | 53.0 | 40.0 | 53.0 | 53.0 |
| distance W10/0.5TWe (%) | — | 35.0 | — | 35.0 | 35.0 | 34.0 | 35.0 | 35.0 | 25.0 | 42.0 | 62.0 | 35.0 | 35.0 | 35.0 | 35.0 |
| angle θ (deg.) | — | 38.0 | — | 38.0 | 38.0 | 38.0 | 38.0 | 38.0 | 38.0 | 38.0 | 38.0 | 38.0 | 38.0 | 30.0 | 45.0 |
| angle δ (deg.) | — | 12.0 | — | 12.0 | 12.0 | 38.0 | 12.0 | 12.0 | 12.0 | 12.0 | 12.0 | 12.0 | 16.0 | 12.0 | 12.0 |
| distance W11/0.5TWe (%) | 48.0 | 48.0 | 48.0 | 48.0 | 48.0 | 48.0 | 48.0 | 48.0 | 48.0 | 48.0 | 48.0 | 48.0 | 48.0 | 48.0 | 48.0 |
| distance W12/0.5TWe (%) | 95.0 | 95.0 | 95.0 | 95.0 | 95.0 | 95.0 | 95.0 | 95.0 | 95.0 | 95.0 | 95.0 | 95.0 | 95.0 | 95.0 | 95.0 |
| land ratio (%) region S1 | 80.0 | 90.0 | 80.0 | 80.0 | 80.0 | 75.0 | 80.0 | 80.0 | 80.0 | 80.0 | 80.0 | 85.0 | 80.0 | 80.0 | 80.0 |
| region S2 | 80.0 | 80.0 | 80.0 | 80.0 | 80.0 | 75.0 | 80.0 | 80.0 | 75.0 | 82.0 | 90.0 | 80.0 | 80.0 | 80.0 | 80.0 |
| region S3 | 80.0 | 75.0 | 75.0 | 75.0 | 75.0 | 70.0 | 75.0 | 75.0 | 80.0 | 72.0 | 80.0 | 75.0 | 75.0 | 75.0 | 75.0 |
| region S4 | 80.0 | 75.0 | 75.0 | 75.0 | 75.0 | 75.0 | 75.0 | 75.0 | 75.0 | 75.0 | 70.0 | 75.0 | 75.0 | 75.0 | 75.0 |
| region S5 | 80.0 | 85.0 | 90.0 | 85.0 | 85.0 | 80.0 | 85.0 | 85.0 | 85.0 | 85.0 | 85.0 | 85.0 | 80.0 | 85.0 | 85.0 |
| depth ratio d3/d2 (%) | — | 60.0 | 60.0 | 60.0 | 60.0 | 60.0 | 60.0 | 100.0 | 60.0 | 60.0 | 60.0 | 60.0 | 60.0 | 60.0 | 60.0 |
| drainage | 100 | 100 | 100 | 110 | 95 | 110 | 110 | 120 | 105 | 110 | 100 | 105 | 105 | 112 | 105 |
| dry grip | 100 | 105 | 105 | 90 | 105 | 95 | 100 | 100 | 105 | 98 | 95 | 103 | 103 | 98 | 112 |
| wet grip | 100 | 90 | 95 | 110 | 90 | 115 | 120 | 115 | 115 | 115 | 110 | 97 | 97 | 115 | 120 |
| roll characteristic | 100 | 95 | 95 | 100 | 95 | 100 | 100 | 90 | 95 | 100 | 95 | 100 | 100 | 100 | 100 |
| initial stage responsiveness | 100 | 105 | 100 | 95 | 110 | 90 | 97 | 97 | 95 | 97 | 97 | 100 | 97 | 97 | 97 |
| durability | 100 | 100 | 100 | 100 | 100 | 95 | 100 | 90 | 95 | 100 | 100 | 100 | 100 | 100 | 100 |

The invention claimed is:

1. A motorcycle tire comprising
a tread portion provided with tread grooves defining a unidirectional tread pattern having an intended tire rotational direction,
the tread grooves including a center main groove and a plurality of main oblique grooves each with a branch groove,
wherein
the center main groove extends along the tire equator continuously in the tire circumferential direction,
the main oblique grooves are disposed on both sides of the center main groove so that each of the main oblique grooves has an axially inner end at a distance from the center main groove and extends axially outwardly from the axially inner end,
wherein
each of the axially inner ends of the main oblique grooves is positioned at an axial distance from the tire equator in a range of not less than 5% and not more than 15% of the developed half tread width so that the axially inner ends of the main oblique grooves are positioned within a zero-chamber ground contact width, and
each of axially outer ends of the main oblique grooves is positioned at the tread edge so that the axially outer ends of the main oblique grooves are positioned outside the zero-chamber ground contact width,
the main oblique grooves extend from their axially inner ends to axially outer ends, while inclining to the opposite direction to the intended tire rotational direction over their respective entire lengths, at an angle of from 30 to 45 degrees with respect to the tire circumferential direction,
the branch groove is branched off from the main oblique groove and extends toward the opposite direction to the intended tire rotational direction, while inclining to the axially inside, and terminates at a distance from the center main groove without being connected thereto,
a branch point of the branch groove from the main oblique groove, which is defined by an intersecting point between widthwise center lines of the main oblique groove and the branch groove, is in a range between 40% and 60% of the developed half tread width from the tire equator,
wherein
the branch groove is a bent groove made up of a first inclined part extending from the main oblique groove at a substantially constant angle θ in a range from 30 to 45 degrees with respect to the tire circumferential direction, and a second inclined part extending at a substantially constant angle δ in a range from 5 to 20 degrees with respect to the tire circumferential direction,
on each side of the center main groove, a single sub oblique groove shorter than the main oblique grooves, is disposed between every two of the main oblique grooves so that the sub oblique grooves are inclined to the same direction as the main oblique grooves, and
on each side of the tire equator, when the developed half tread width is axially equally divided into five portions, the land ratio of each of the five portions is in a range of 75% to 85%.

2. The motorcycle tire according to claim 1, wherein
the branch groove extends within a range between 20% and 60% of the developed half tread width from the tire equator.

3. The motorcycle tire according to claim 2, wherein
a land ratio Rc of an annular tread portion between 0% and 20% of the developed half tread width from the tire equator,
a land ratio Rm of an annular tread portion between 40% and 60% of the developed half tread width from the tire equator, and
a land ratio Rs of an annular tread portion between 80% and 100% of the developed half tread width from the tire equator satisfy the following condition: Rm<Rc<Rs.

4. The motorcycle tire according to claim 1, wherein
a land ratio Rc of an annular tread portion between 0% and 20% of the developed half tread width from the tire equator,
a land ratio Rm of an annular tread portion between 40% and 60% of the developed half tread width from the tire equator, and
a land ratio Rs of an annular tread portion between 80% and 100% of the developed half tread width from the tire equator satisfy the following condition: Rm<Rc<Rs.

5. A motorcycle tire comprising
a tread portion provided with tread grooves defining a unidirectional tread pattern having an intended tire rotational direction,
the tread grooves including a center main groove and a plurality of main oblique grooves each with a branch groove,
wherein
the center main groove extends along the tire equator continuously in the tire circumferential direction,
the main oblique grooves are disposed on both sides of the center main groove so that each of the main oblique grooves has an axially inner end at a distance from the center main groove and extends axially outwardly from the axially inner end, while inclining to the opposite direction to the intended tire rotational direction, at an angle of from 30 to 45 degrees with respect to the tire circumferential direction,
the axially inner ends of the main oblique grooves are positioned within a zero-chamber ground contact width, and
axially outer ends of the main oblique grooves are positioned outside the zero-chamber ground contact width and each at a distance of from 0% to 20% of a developed half tread width from the tread edge,
the branch groove is branched off from the main oblique groove and extends toward the opposite direction to the intended tire rotational direction, while inclining to the axially inside, and terminates at a distance from the center main groove without being connected thereto,
the branch groove is a bent groove comprising a first inclined part extending from the main oblique groove at an angle $\theta$ with respect to the tire circumferential direction, and a second inclined part extending at an angle $\delta$ with respect to the tire circumferential direction which is less than the angle $\theta$,
on each side of the tire equator, when the developed half tread width is axially equally divided into five portions, the land ratio of each of the five portions is in a range of 75% to 85%,
wherein
a branch point of the branch groove from the main oblique groove, which is defined by an intersecting point between widthwise center lines of the main oblique groove and the branch groove, is in a range between 40% and 60% of the developed half tread width from the tire equator, and
the branch groove extends within a range between 20% and 60% of the developed half tread width from the tire equator,
wherein
the depth of the branch groove is in a range of from 50% to 70% of the depth of the main oblique groove at the branch point.

6. The motorcycle tire according to claim 5, wherein
a bent point of the branch groove, which is defined by an intersecting point between the widthwise center line of the first inclined part and the widthwise center line of the second inclined part, is in a range between 20% and 40% of the developed half tread width from the tire equator.

7. The motorcycle tire according to claim 5, wherein
a land ratio Rc of an annular tread portion between 0% and 20% of the developed half tread width from the tire equator,
a land ratio Rm of an annular tread portion between 40% and 60% of the developed half tread width from the tire equator, and
a land ratio Rs of an annular tread portion between 80% and 100% of the developed half tread width from the tire equator satisfy the following condition: Rm<Rc<Rs.

* * * * *